United States Patent
Chen et al.

(10) Patent No.: US 12,316,253 B2
(45) Date of Patent: May 27, 2025

(54) DRIVING VOLTAGE GENERATION METHOD OF LINEAR MOTOR

(71) Applicant: AAC Acousitc Technologies (Shanghai) Co., Ltd., Shanghai (CN)

(72) Inventors: Yongyong Chen, Shenzhen (CN); Yajun Zheng, Shenzhen (CN); Zheng Xiang, Shenzhen (CN)

(73) Assignee: AAC Acousitic Technologies (Shanghai) Co., Ltd., Shanghai (CN)

( * ) Notice: Subject to any disclaimer, the term of this patent is extended or adjusted under 35 U.S.C. 154(b) by 554 days.

(21) Appl. No.: 17/566,683

(22) Filed: Dec. 31, 2021

(65) Prior Publication Data
US 2023/0133888 A1 May 4, 2023

(30) Foreign Application Priority Data
Oct. 29, 2021 (CN) .......................... 202111268082.4

(51) Int. Cl.
| | | |
|---|---|---|
| H02K 16/02 | (2006.01) | |
| H02P 25/032 | (2016.01) | |
| G08B 6/00 | (2006.01) | |

(52) U.S. Cl.
CPC .............. *H02P 25/032* (2016.02); *G08B 6/00* (2013.01)

(58) Field of Classification Search
CPC ...................................................... H02P 25/034
See application file for complete search history.

(56) References Cited

U.S. PATENT DOCUMENTS

| | | | | |
|---|---|---|---|---|
| 6,155,542 A | * | 12/2000 | Kato | ........................ H01L 21/68 |
| | | | | 267/136 |
| 2010/0204881 A1 | * | 8/2010 | Muragishi | ............. B60G 17/018 |
| | | | | 267/140.15 |
| 2016/0018294 A1 | * | 1/2016 | Moriya | .................. G01M 17/04 |
| | | | | 73/11.07 |

* cited by examiner

*Primary Examiner* — Kawing Chan
*Assistant Examiner* — Charles S Laughlin
(74) *Attorney, Agent, or Firm* — Wiersch Law Group

(57) ABSTRACT

The present invention provides a linear motor driving voltage generation method and related devices. The object is to use the driving voltage generated by the driving voltage generation method to effectively control the linear motor to express the vibration effect in a specific direction. The method of an embodiment of the present invention includes: determining the system gain and current phase of the linear motor system, obtaining the target acceleration and amplitude of initial value of the linear motor, calculating the driving based on the target acceleration and the initial value amplitude, the system gain, and the current phase.

4 Claims, 5 Drawing Sheets

DRIVING VOLTAGE GENERATION METHOD OF LINEAR MOTOR

FIELD OF THE PRESENT DISCLOSURE

The present invention relates to the technical field of linear motors, in particular to a driving voltage generation method of linear motor and related devices.

DESCRIPTION OF RELATED ART

The tactile feedback in the prior art plays an important role in the interactive experience of electronic products. The form of tactile feedback is often realized by the vibration of a linear motor, which can bring users an immersive and real experience. In the prior art, linear motor as a generator of vibration effects is more and more widely used in high-end mobile phones, but the current application of linear motor in mobile phones only provides users with a vibration reminder function, and users cannot perceive clear vibration direction.

Therefore, it is necessary to provide a driving voltage generation method and related devices that enable users to perceive the clear vibration direction of a linear motor.

SUMMARY OF THE PRESENT INVENTION

One purpose of the present invention is to provide a linear motor driving voltage generation method and related devices, aiming to enable the driving voltage generated by the voltage generation method to effectively control the linear motor to express the vibration effect in a specific direction.

To achieve the above-mentioned objects, the present invention provides a driving voltage generation method of a linear motor system, including steps of:
  determining a system gain and a current phase of the linear motor system;
  obtaining a target acceleration and an amplitude of an initial value of the linear motor system installed;
  obtaining a driving voltage by calculation based on the target acceleration and the amplitude of initial value, the system gain, and the current phase.
In addition, the driving voltage generation method, after calculating the driving voltage based on the target acceleration and the amplitude of initial value, the system gain, and the current phase, further includes steps of:
  obtaining an amplitude of a target voltage for the target acceleration of the linear motor system;
  determining whether the driving voltage reaches the amplitude of target voltage;
  if the driving voltage does not reach the amplitude of target voltage, increasing the driving voltage according to preset rules to obtain drive increase voltage;
  using the drive increase voltage as the new driving voltage, performing the step of judging whether the driving voltage reaches the amplitude of target voltage;
  if the driving voltage reaches the amplitude of target voltage, outputting the driving voltage.
In addition, the step of obtaining the driving voltage by calculation based on the target acceleration and the amplitude of initial value, the system gain and the current phase satisfies the following condition:

$$U = \frac{A_1}{|G(j\omega)|}\sin(\omega t - \angle G(j\omega)) + \frac{A_2}{|G(j2\omega)|}\sin(2\omega t + \Phi_0 - \angle G(j2\omega))$$

where, U is the driving voltage;
  $A_1$ is the amplitude of fundamental frequency acceleration of the target acceleration;
  $\omega$ is the angular frequency;
  t is time;
  $\angle G(j\omega)$ is the current phase;
  $|G(j\omega)|$ is system gain;
  $A_2$ is the second harmonic acceleration amplitude of the target acceleration; and
  $\phi_0 = 0$ or $-\pi$.

In addition, the step of increasing the driving voltage according to preset rules to obtain drive increase voltage includes:
  when the fundamental frequency of the target acceleration is lower than 70 Hz, the first preset ratio of $A_1:A_2$ is equal to 1:1;
  gradually increasing the values of $A_1$ and $A_2$ according to the first preset ratio to obtain the drive increase voltage.
In addition, the step of increasing the driving voltage according to preset rules to obtain drive increase voltage includes:
  when the fundamental frequency of the target acceleration is higher than 65 Hz and lower than 90 Hz, the second preset ratio of $A_1:A_2$ is equal to 2:1;
  gradually increasing the values of $A_1$ and $A_2$ according to the second preset ratio to obtain the drive increase voltage.
In addition, the step of determining the system gain and current phase of the linear motor system includes:
  using a step signal or a chirp signal for sweeping the frequency to determine the system gain and the current phase of the installed linear motor system.

The present invention further provides a driving voltage generation device of a linear motor system, including:
  a determination unit, for determine a system gain and a current phase of the installed linear motor system;
  an acquiring unit, for acquiring a target acceleration and an amplitude of initial value of the linear motor system installed;
  a calculation unit, configured to for calculating the driving voltage based on the target acceleration, the amplitude of initial value, the system gain, and the current phase.

The present invention further provides an application structure of linear motors, including one or more linear motors, and a driving voltage generation device as described above electrically connected to the linear motors, wherein the linear motors realize directional vibration when the driving voltage generated by the driving voltage generation device is input.

In addition, the application structure of linear motors includes a first linear motor, a second linear motor and a third linear motor, wherein the first linear motor and the second linear motor are vertically installed on both sides of the application structure; the third linear motor is installed horizontally in a middle of the application structure.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

The first thing to note is that because people's perception of vibration is non-linear, when people experience strong and weak vibration stimulation in a short period of time, they will obviously perceive strong vibration stimulation, but will not clearly perceive weak ones. Vibration stimulation. Based on this, if a strong vibration stimulation in a specific direction is applied to a person in a continuous period of time, the person can have a sense of movement in the specific direction. Based on this, the human perceivable directional acceleration (target acceleration) waveform is defined as the linear superposition of the fundamental frequency acceleration and its second harmonic, as shown in the following formula:

$$\ddot{x}_{ref} = A_1 \sin \omega t + A_2 \sin(2\omega t + \Phi_0)$$

In the formula, $A_1, \omega$ and $\omega$ are the amplitude of fundamental frequency acceleration and angular frequency respectively, and $A_2, \Phi_0$ are the amplitude and phase of the second harmonic acceleration, respectively, and $-\pi$ means the opposite direction.

Figure 1:
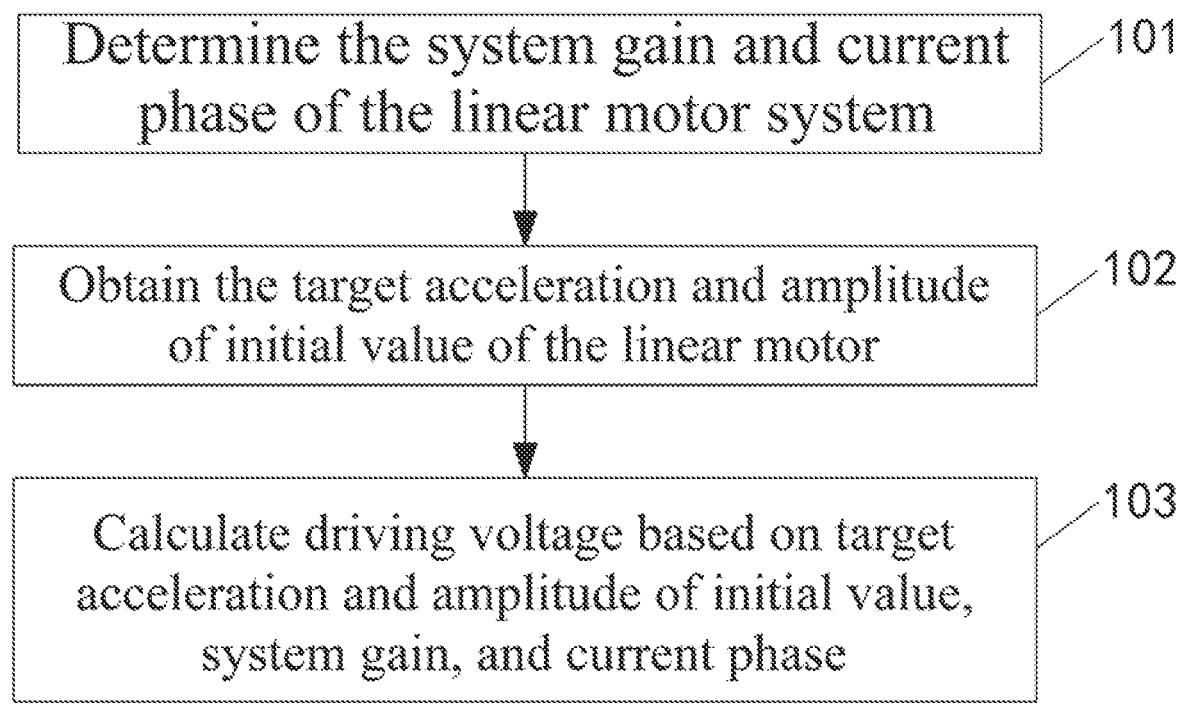
FIG. 1 is a schematic flowchart of an embodiment of the driving voltage generation method of a linear motor of the present invention.

Please refer to FIG. 1, an embodiment of a method for generating a driving voltage of a linear motor of the present invention includes:

101. Determine the system gain and current phase of the linear motor system.

The embodiment of the present invention first needs to determine the relevant parameters of the linear motor to be controlled, so as to know the current state of the linear motor and how to control the linear motor. In this step, at least the system gain and current phase of the linear motor system should be determined. By installing the system gain of the linear motor system, the magnification between the control signal of the linear motor and the driving signal of the linear motor can be known, and then how to control the linear motor can be known. In this step, the current phase of the linear motor can be obtained through the position sensor in the linear motor, and then the current state of the linear motor can be obtained.

102. Obtain the target acceleration and amplitude of initial value of the linear motor.

Figure 3:
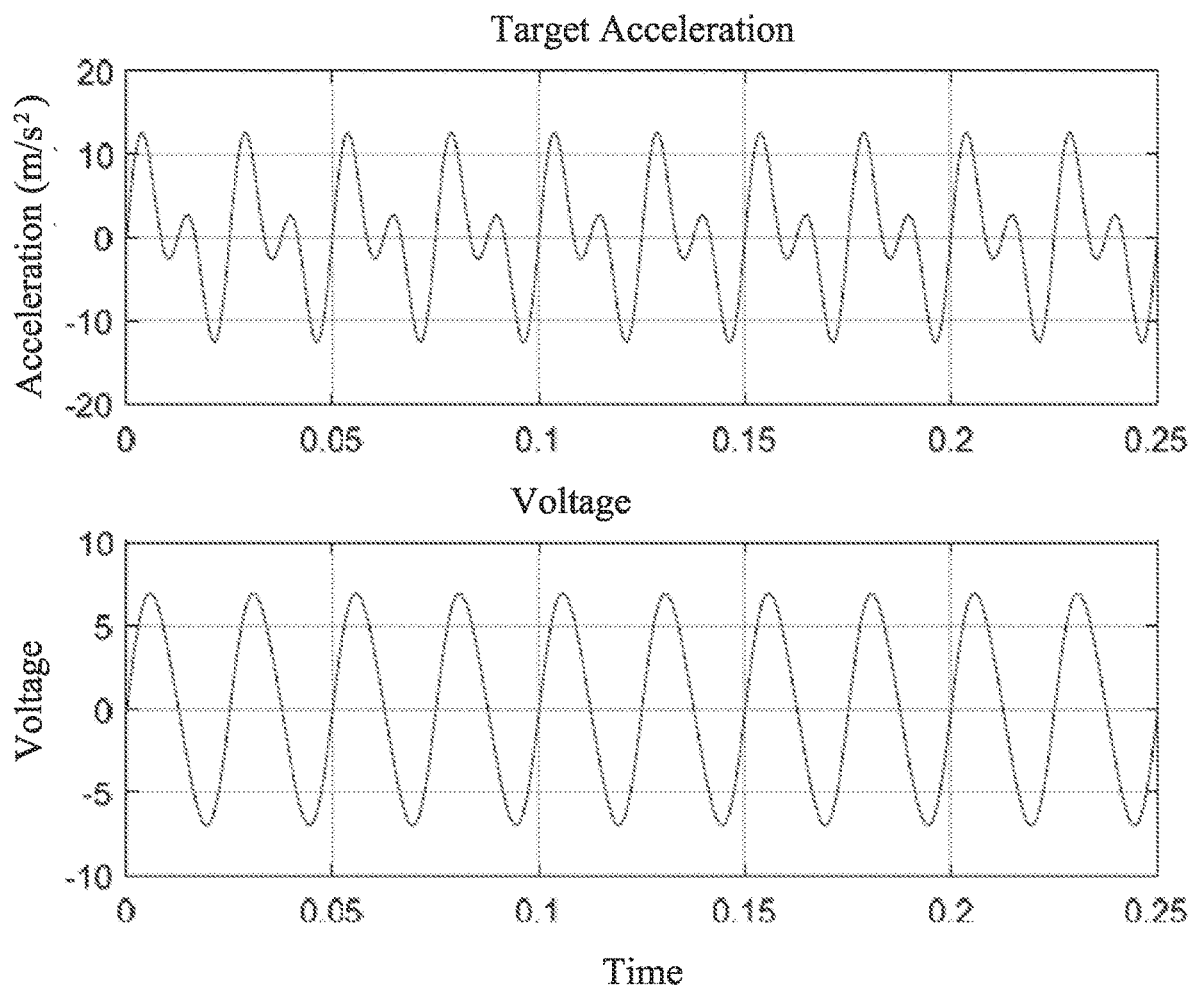
FIG. 3 is a schematic diagram of an embodiment of the target acceleration of the linear motor and the corresponding driving voltage of the present invention.

It is understandable that the vibrator in the linear motor is moved directionally by the magnetic force in the linear motor. When the resistance of the linear motor is constant, according to Ohm's law: The greater the voltage applied across the linear motor, the greater the current flowing into the linear motor. A larger current can make the linear motor generate greater magnetic force, which in turn can make the linear motor's vibrator obtain greater acceleration. In other words, there is a corresponding relationship between the acceleration of the linear motor's vibrator and the voltage applied to both ends of the linear motor. Please refer to FIG. 3 in combination. As an example, FIG. 3 shows the corresponding relationship diagram between the target acceleration generated based on the target frequency of 40 Hz and the amplitude of target voltage of 7 volts and the corresponding driving voltage. Based on this understanding, this step needs to obtain the target acceleration and amplitude of initial value of the linear motor.

103. Calculate driving voltage based on target acceleration and amplitude of initial value, system gain, and current phase.

In step 101, it is known that the system gain and current phase of the linear motor system are installed. After obtaining the linear motor's target acceleration and amplitude of initial value in step 102, this step is used to calculate the linear motor's need to achieve the target acceleration driving voltage. Furthermore, the driving voltage can be used to load the linear motor to achieve effective control of the linear motor to express the vibration effect in the specific direction.

It can be seen that the driving voltage generation method of the linear motor of the present invention knows the current state of the linear motor by determining the system gain and current phase of the linear motor system. Then get the target acceleration and amplitude of initial value of the linear motor to get the target status of the linear motor control. Calculate driving voltage based on target acceleration and amplitude of initial value, system gain and current phase, obtain the driving voltage required to convert the linear motor from the current state to the target status. Because of the driving voltage, the linear motor can generate acceleration in a specific direction. The linear motor will show strong vibration stimulation in the specific direction. The driving voltage generated by this voltage generation method can effectively control the linear motor to express the directional vibration effect in the specific direction.

Figure 2:
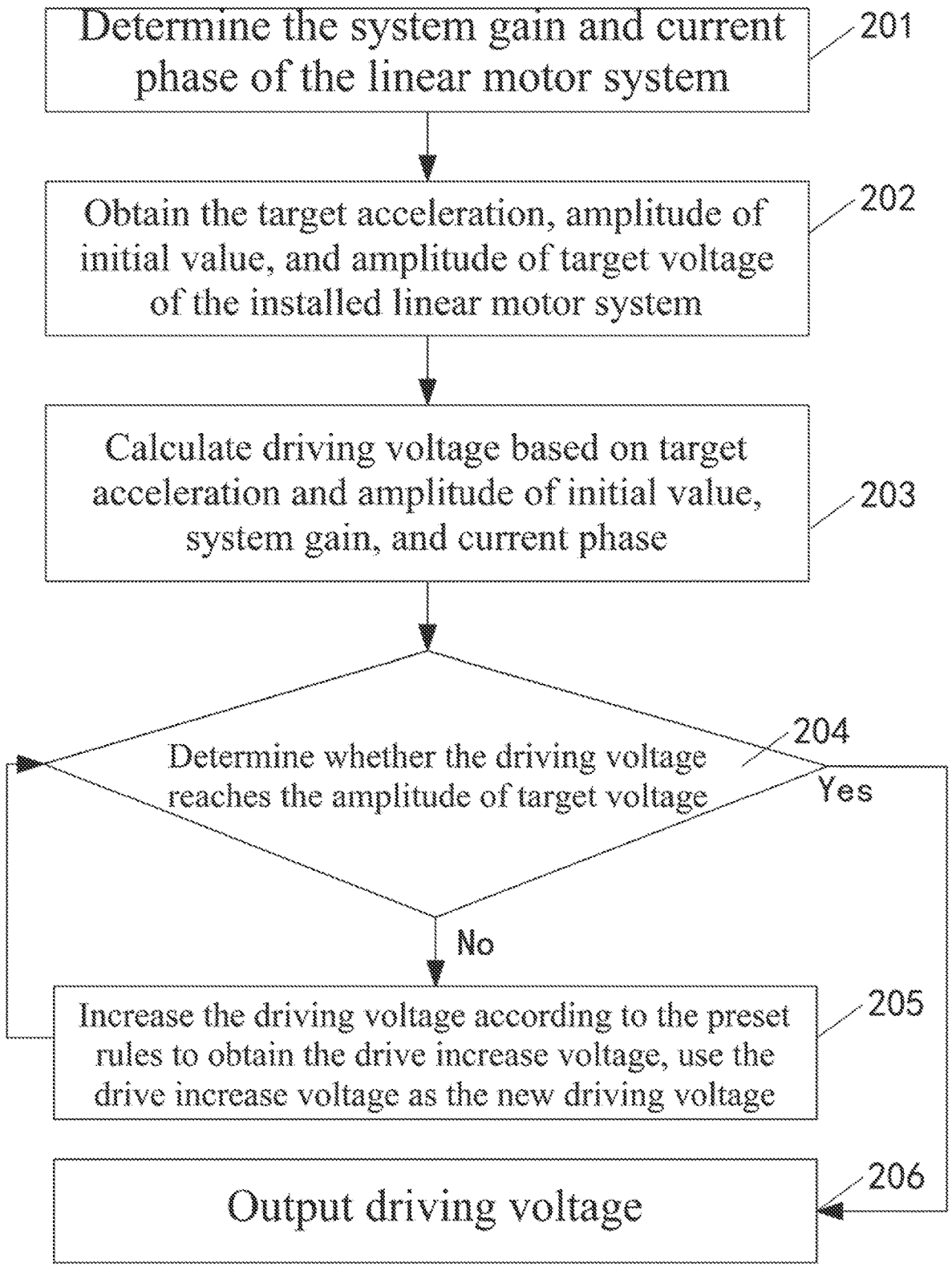
FIG. 2 is a schematic flowchart of another embodiment of the driving voltage generation method of the linear motor of the present invention.

Please refer to FIG. 2, another embodiment of the driving voltage generation method of the linear motor of the present invention includes:

201. Determine the system gain and current phase of the linear motor system.

The execution of this step is similar to the operation of step 101 in FIG. 1, and the repeated part will not be repeated here.

It is worth noting that, in this step, the system gain and the current phase of the linear motor system can be determined by using a step signal or a chirp signal to sweep the frequency.

202. Obtain the target acceleration, amplitude of initial value, and amplitude of target voltage of the installed linear motor system.

The execution of this step is similar to the operation of step 102 in FIG. 1, and the repeated part will not be repeated here.

It should be noted that this step also needs to further obtain the amplitude of target voltage of the target acceleration of the installed linear motor system, and the amplitude of target voltage is the minimum voltage required to drive the linear motor.

203. Calculate driving voltage based on target acceleration and amplitude of initial value, system gain, and current phase.

In this step, the voltage at each moment based on target acceleration can be calculated by the following formula:

$$U = \frac{A_1}{|G(j\omega)|}\sin(\omega t - \angle G(j\omega)) + \frac{A_2}{|G(j2\omega)|}\sin(2\omega t + \Phi_0 - \angle G(j2\omega))$$

In the formula, U is the driving voltage.

$A_1$ is the amplitude of fundamental frequency acceleration of the target acceleration.

$\omega$ is the angular frequency.

t is time.

$\angle G(j\omega)$ is the current phase.

$|G(j\omega)|$ is system gain.

$A_2$ is the second harmonic acceleration amplitude of the target acceleration.

$\Phi_0 = 0$ or $-\pi$, which means the opposite direction.

204. Determine whether the driving voltage reaches the amplitude of target voltage, and if the driving voltage does not reach the amplitude of target voltage, perform step 205. If the driving voltage reaches the amplitude of target voltage, step 206 is executed.

After calculating the driving voltage for the linear motor in step 203, this step further compares the driving voltage with the amplitude of target voltage obtained in step 202 to determine whether the driving voltage reaches the amplitude of target voltage, so as to determine whether the driving voltage is acceptable Drive the linear motor normally.

205. Increase the driving voltage according to the preset rules to obtain the drive increase voltage, use the drive increase voltage as the new driving voltage, and trigger the execution of step 204.

When it is determined in step 204 that the driving voltage has not reached the amplitude of target voltage, the driving voltage is increased in this step according to the preset rules, and the drive increase voltage is obtained. For example, the preset rules can be: When the fundamental frequency of target acceleration is lower than 70 Hz, the first preset ratio of $A_1:A_2$ is equal to 1:1. Gradually increase the values of $A_1$ and $A_2$ according to the first preset ratio, and then recalculate the new driving voltage according to the formula in step 203 to obtain drive increase voltage. Or, when the fundamental frequency of the target acceleration is higher than 65 Hz and lower than 90 Hz, the second preset ratio of $A_1:A_2$ is equal to 2:1. Gradually increase the values of $A_1$ and $A_2$ according to the second preset ratio, and then recalculate the new driving voltage according to the formula in step 203 to obtain drive increase voltage. The above is only an example. There are many preset rules for improving the driving voltage, and there are no further restrictions here. After the drive increase voltage is obtained in this step, the drive increase voltage is used as the new driving voltage in this step, and step 204 is triggered to determine whether the new driving voltage reaches the amplitude of target voltage again.

206. Output driving voltage.

When it is determined in step 204 that the driving voltage reaches the amplitude of target voltage, this step can directly apply the driving voltage to both ends of the linear motor.

It is understandable that after periodically determining the magnitude and direction of the target acceleration for the linear motor, the driving voltage corresponding to the target acceleration at each moment in the time period can be calculated according to the formula in step 203 above. The driving voltage set at each moment can form the driving voltage waveform that periodically controls the linear motor.

Figure 4:
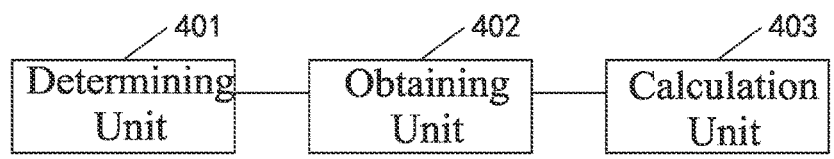
FIG. 4 is a schematic structural diagram of an embodiment of a driving voltage generation device of a linear motor of the present invention.

The driving voltage generation method of the linear motor of the present invention is described above. The following describes the driving voltage generation device of the linear motor of the present invention, please refer to FIG. 4, including:

a determining unit 401, used to determine the system gain and current phase of the linear motor.

an obtaining unit 402, used to obtain the amplitude of initial value of the target acceleration of the linear motor.

a calculation unit 403, used to calculate the driving voltage based on the amplitude of initial value of the target acceleration, the system gain, and the current phase.

The operation performed by the driving voltage generation device of the linear motor in the embodiment of the present invention is similar to the operation performed in the foregoing embodiment in FIG. 1, and details are not described herein again.

It can be seen that the driving voltage generation device of the linear motor of the present invention knows the current state of the linear motor by determining the system gain and current phase of the linear motor. Then get the amplitude of initial value of the linear motor's target acceleration, and get the target status of the linear motor's control. The driving voltage can be calculated based on the amplitude of initial value, system gain, and current phase of the target acceleration, and the driving voltage required to convert the linear motor from the current state to the target status can be obtained. Since the driving voltage can cause the linear motor to produce acceleration in a specific direction, the linear motor will show strong vibration stimulation in the specific direction. The driving voltage generated by the driving voltage generation device can effectively control the linear motor to express the directional vibration effect in the specific direction.

Figure 5:
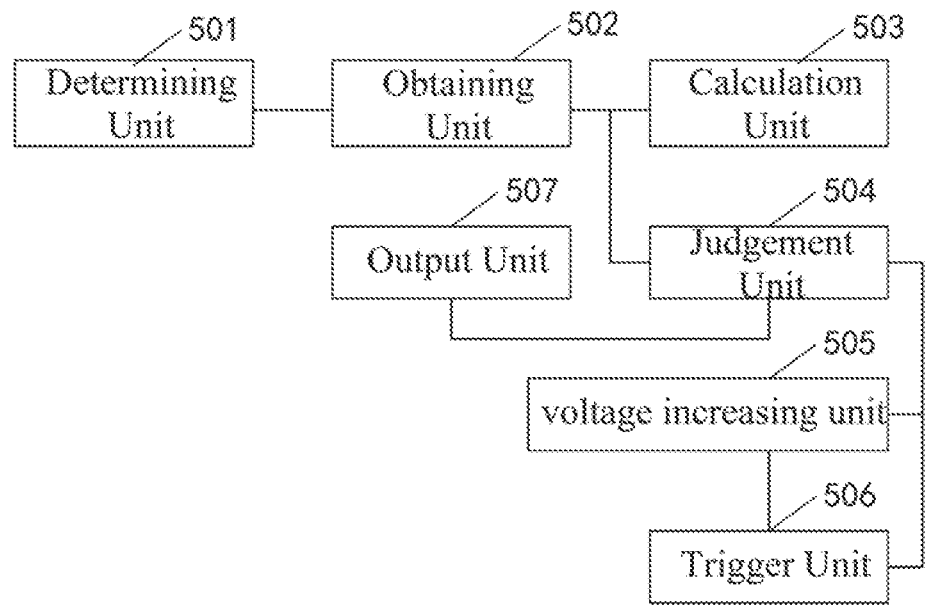
FIG. 5 is a schematic structural diagram of another embodiment of a driving voltage generation device of a linear motor of the present invention.

Please refer to FIG. 5, another embodiment of the voltage generating device of the linear motor of the present invention includes:

a determining unit 501, used to determine the system gain and current phase of the linear motor system installed.

an obtaining unit 502, used to obtain the target acceleration and the amplitude of initial value of the linear motor system installed.

a calculation unit 503, used to obtain a driving voltage by calculation based on the target acceleration and the amplitude of initial value, the system gain, and the current phase.

Optionally, the device further includes:

an obtaining unit 502, used to obtain the amplitude of target voltage for the target acceleration of the linear motor.

a judgement unit 504, used to determine whether the driving voltage reaches the amplitude of target voltage.

a voltage increasing unit 505, used to increase the driving voltage according to preset rules if the driving voltage does not reach the amplitude of target voltage to obtain a drive increase voltage.

The trigger unit 506 is configured to use the drive increase voltage as the new driving voltage and trigger the execution of the step of determining whether the driving voltage reaches the amplitude of target voltage.

The output unit 507 is configured to output the driving voltage if the driving voltage reaches the amplitude of target voltage.

Optionally, when the calculation unit 503 obtains the driving voltage by calculation based on the target acceleration and the amplitude of initial value, the system gain, and the current phase, it is specifically configured to:

$$U = \frac{A_1}{|G(j\omega)|}\sin(\omega t - \angle G(j\omega)) + \frac{A_2}{|G(j2\omega)|}\sin(2\omega t + \Phi_0 - \angle G(j2\omega))$$

In the formula, U is the driving voltage.

$A_1$ is the amplitude of fundamental frequency acceleration of the target acceleration.

$\omega$ is the angular frequency.

t is time.

$\angle G(j\omega)$ is the current phase.

$|G(j\omega)|$ is system gain.

$A_2$ is the second harmonic acceleration amplitude of the target acceleration.

$\Phi_0 = 0$ or $-\pi$.

Optionally, the increasing the driving voltage according to preset rules to obtain the drive increase voltage includes:

When the fundamental frequency of the target acceleration is lower than 70 Hz, the first preset ratio of $A_1:A_2$ is equal to 1:1.

Gradually increase the values of $A_1$ and $A_2$ according to the first preset ratio to obtain the drive increase voltage.

Optionally, the increasing the driving voltage according to preset rules to obtain the drive increase voltage includes:

When the fundamental frequency of the target acceleration is higher than 65 Hz and lower than 90 Hz, the second preset ratio of $A_1:A_2$ is equal to 2:1.

Gradually increase the values of $A_1$ and $A_2$ according to the second preset ratio to obtain the drive increase voltage.

Optionally, the determining the system gain and current phase of the linear motor includes:

A step signal or a chirp signal is used to sweep the frequency to determine the system gain and the current phase of the installed linear motor system.

The operation performed by the driving voltage generation device of the linear motor in the embodiment of the present invention is similar to the operation performed in the foregoing embodiment in FIG. 2, and details are not described herein again.

Figure 6:
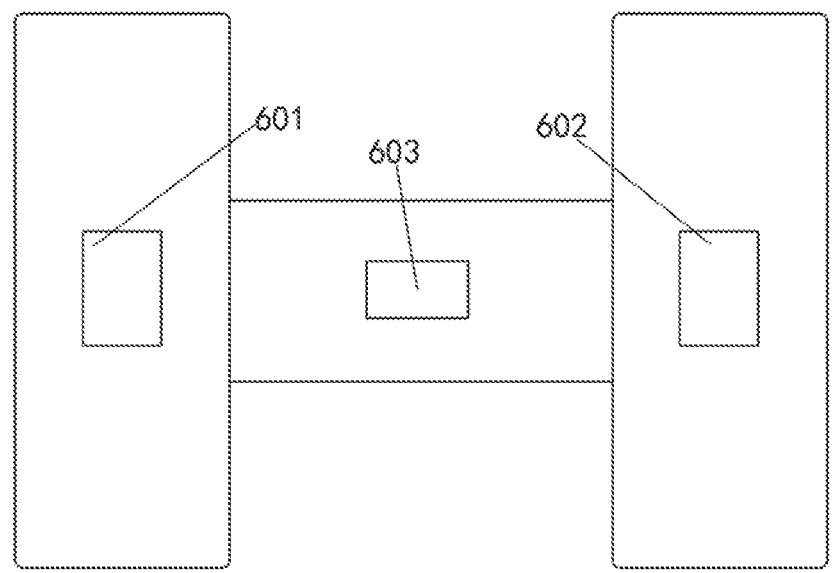
FIG. 6 is a schematic diagram of an embodiment of the application structure of a linear motor of the present invention.

Please refer to FIG. 6, an embodiment of the application structure of the linear motor of the present invention includes: One or more linear motors, and the driving voltage generation device of the linear motor described in the above embodiments. The driving voltage generation device is electrically connected to the linear motor. And the linear motor realizes directional vibration under the driving voltage input of the driving voltage generation device.

It can be understood that, in a specific embodiment, the application structure in FIG. 6 specifically includes three linear motors: first linear motor 601, second linear motor 602 and third linear motor 603. The first linear motor 601 and the second linear motor 602 are installed vertically on both sides of the application structure, and the third linear motor 603 is installed horizontally in the middle of the application structure. The application structure can be a game handle, a somatosensory device in a virtual scene, and so on. When the application structure adopts the linear motor arrangement as shown in FIG. 6, when the user holds the application structure, the third linear motor 603 can achieve directional vibration under the driving voltage generated by the driving voltage generation device of the above embodiment, which allows the user to Perceive horizontal left or right directional vibration. When the user holds both hands on both sides of the application structure, if the first linear motor 601 and the second linear motor 602 have the same phase of the driving voltage generated by the driving voltage generation device of the above embodiment, the user can perceive the vertical upward or downward direction. Vertical downward directional vibration. If the first linear motor 601 and the second linear motor 602 have opposite phases of the driving voltage generated by the driving voltage generation device of the above embodiment, the user can perceive clockwise or counterclockwise rotational vibration. It can be seen that the application structure of the linear motor of the present invention can realize the feedback of the vibration effect in the three-dimensional space, which gives people a more realistic feeling. Preferably, the vibration generated when the application structure is placed on the desktop can overcome the static friction of the desktop to generate directional movement.

Figure 7:
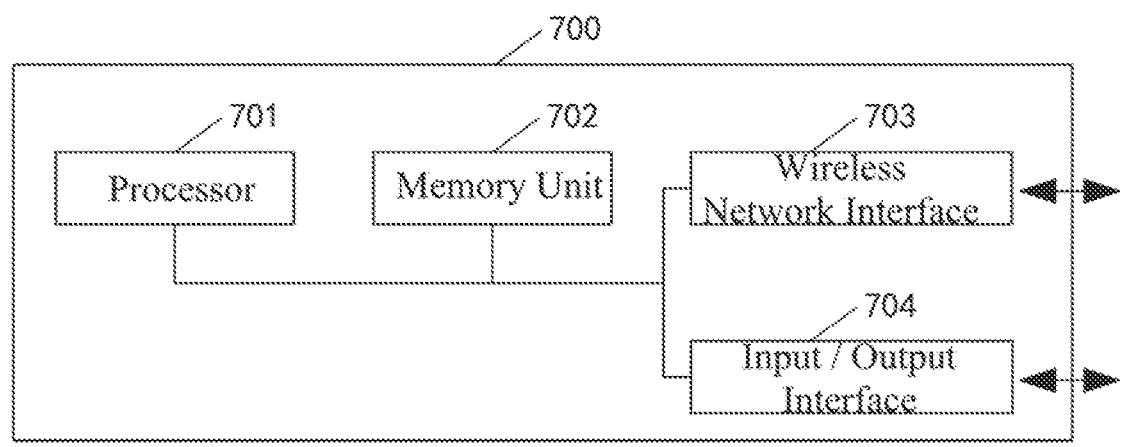
FIG. 7 is a schematic structural diagram of an embodiment of computer equipment of the present invention.

The following describes the computer equipment in the embodiment of the present invention. Please refer to FIG. 7. An embodiment of the computer equipment in the embodiment of the present invention includes:

The computer equipment 700 may include one or more processor (central processing units, CPU) 701 and a memory unit 702, and the memory unit 702 stores one or more application programs or data. Wherein, the memory unit 702 is volatile storage or persistent storage. The program stored in the memory unit 702 may include one or more modules, and each module may include a series of command operations on computer equipment. Furthermore, the processor 701 may be configured to communicate with the memory unit 702, and execute a series of instruction operations in the memory unit 702 on the computer equipment 700. The computer equipment 700 may also include one or more wireless network interfaces 703, one or more input and output interfaces 704, and/or one or more operating systems, such as Windows Server, Mac OS, Unix, Linux, FreeBSD, etc. The processor 701 can perform the operations performed in the foregoing embodiments shown in FIG. 1 to FIG. 2, and details are not described herein again.

In the several embodiments provided in the embodiments of the present invention, those skilled in the art should understand that the disclosed system, device, and method may be implemented in other ways. For example, the device embodiments described above are merely illustrative. For example, the division of this unit is only a logical function division, and there may be other division methods in actual implementation. For example, multiple units or components can be combined or integrated into another system, or some features can be omitted or not implemented. In addition, the displayed or discussed mutual coupling or direct coupling or communication connection may be through some interfaces. The indirect coupling or communication connection of the device or unit may be in electrical, mechanical or other forms.

In addition, the functional units in the various embodiments of the present invention may be integrated into one processing unit, or each unit may exist alone physically, or two or more units may be integrated into one unit. The above-mentioned integrated unit can be implemented in the form of hardware or software functional unit. If the integrated unit is implemented in the form of a software functional unit and sold or used as an independent product, it can be stored in a computer readable storage medium. Based on this understanding, the technical solution of the present invention can be embodied in the form of a software product in essence or a part that contributes to the existing technology, or all or part of the technical solution. The computer software product is stored in a storage medium, and includes a number of instructions to enable a computer equipment (which may be a personal computer, a server, or a network device, etc.) to perform all or part of the steps of the methods in the various embodiments of the present invention. The aforementioned storage medium includes: U disk, mobile hard disk, read-only memory unit (ROM, read-only memory), random access memory unit (RAM, random access memory), magnetic disk or CD-ROM and other media that can store program codes.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A driving voltage generation method of a linear motor system, including steps of:

A controller determining a system gain and a current phase of the linear motor system;

obtaining a target acceleration and an amplitude of an initial value of the linear motor system installed;

obtaining a driving voltage by calculation based on the target acceleration and the amplitude of initial value, the system gain, and the current phase;

wherein a driving voltage generation device causes a linear motor of the linear motor system to generate acceleration in a specific direction and expresses the directional vibration effect in the specific direction;

wherein, after calculating the driving voltage based on the target acceleration and the amplitude of initial value, the system gain, and the current phase, the method further includes steps of:

obtaining an amplitude of a target voltage for the target acceleration of the linear motor system;

determining whether the driving voltage reaches the amplitude of target voltage;

if the driving voltage does not reach the amplitude of target voltage, increasing the driving voltage according to preset rules to obtain drive increase voltage; using the drive increase voltage as the new driving voltage, performing a step of judging whether the driving voltage reaches the amplitude of target voltage;

if the driving voltage reaches the amplitude of target voltage, outputting the driving voltage to the linear motor;

wherein the step of obtaining the driving voltage by calculation based on the target acceleration and the amplitude of initial value, the system gain and the current phase satisfies the following condition:

$$U = \frac{A_1}{|G(j\omega)|}\sin(\omega t - \angle G(j\omega)) + \frac{A_2}{|G(j2\omega)|}\sin(2\omega t + \Phi_0 - \angle G(j2\omega))$$

where, U is the driving voltage;
A1 is an amplitude of fundamental frequency acceleration of the target acceleration;
$\omega$ is an angular frequency;
t is time;
$\angle G(j\omega)$ is an current phase;
$|G(j\omega)|$ is a system gain;
A2 is a second harmonic acceleration amplitude of the target acceleration; and
$\Phi_0 = 0$ or $-\pi$.

2. The driving voltage generation method as described in claim 1, wherein the step of increasing the driving voltage according to preset rules to obtain drive increase voltage includes:

when the fundamental frequency of the target acceleration is lower than 70 Hz, a first preset ratio of A1:A2 is equal to 1:1;

gradually increasing the values of A1 and A2 according to the first preset ratio to obtain the drive increase voltage.

3. The driving voltage generation method as described in claim 1, wherein the step of increasing the driving voltage according to preset rules to obtain drive increase voltage includes:

when the fundamental frequency of the target acceleration is higher than 65 Hz and lower than 90 Hz, a second preset ratio of A1:A2 is equal to 2:1;

gradually increasing the values of A1 and A2 according to the second preset ratio to obtain the drive increase voltage.

4. The driving voltage generation method as described in claim 1, wherein the step of determining the system gain and current phase of the linear motor system includes:

using a step signal or a chirp signal for sweeping the frequency to determine the system gain and the current phase of the installed linear motor system.

* * * * *